US012044073B2

(12) United States Patent
Maxfield et al.

(10) Patent No.: US 12,044,073 B2
(45) Date of Patent: Jul. 23, 2024

(54) FOOT FOR LADDERS, LADDERS INCORPORATING SAME AND RELATED METHODS

(71) Applicant: Little Giant Ladder Systems, LLC, Springville, UT (US)

(72) Inventors: B. Scott Maxfield, Mapleton, UT (US); N. Ryan Moss, Mapleton, UT (US)

(73) Assignee: LITTLE GIANT LADDER SYSTEMS, LLC, Springville, UT (US)

(*) Notice: Subject to any disclaimer, the term of this patent is extended or adjusted under 35 U.S.C. 154(b) by 1027 days.

(21) Appl. No.: 16/751,720

(22) Filed: Jan. 24, 2020

(65) Prior Publication Data

US 2020/0240210 A1 Jul. 30, 2020

Related U.S. Application Data

(60) Provisional application No. 62/797,046, filed on Jan. 25, 2019.

(51) Int. Cl.

*E06C 7/42* (2006.01)
*E06C 1/06* (2006.01)
*E06C 1/18* (2006.01)
*E06C 1/32* (2006.01)

(52) U.S. Cl.

CPC .................. *E06C 7/42* (2013.01); *E06C 1/06* (2013.01); *E06C 1/18* (2013.01); *E06C 1/32* (2013.01)

(58) Field of Classification Search

CPC ............... E06C 7/42; E06C 7/46; F16B 2/065
See application file for complete search history.

(56) References Cited

U.S. PATENT DOCUMENTS

| | | | |
|---|---|---|---|
| 214,377 | A | 4/1879 | Dyer |
| 507,784 | A | 10/1893 | Congdon |
| 912,409 | A | 2/1909 | Plasterer |
| 964,324 | A | 7/1910 | Spaulding |
| 1,024,380 | A | 4/1912 | Vierheller |
| 1,100,823 | A | 6/1914 | Gordon |

(Continued)

FOREIGN PATENT DOCUMENTS

| | | | |
|---|---|---|---|
| CA | 2881525 | A1 | 9/2015 |
| CN | 206636475 | U | 11/2017 |

(Continued)

OTHER PUBLICATIONS

Extended European Search Report for European Application No. 19814793.6 dated Jan. 18, 2022.

(Continued)

*Primary Examiner* — Colleen M Chavchavadze
(74) *Attorney, Agent, or Firm* — Dorsey & Whitney LLP

(57) ABSTRACT

Ladders, feet for ladders and related methods are described herein. In one embodiment, a ladder is provided that includes, a first rail and a second rail, a plurality of rungs extending between and coupled to the first rail and the second rail, a first foot coupled with the first rail. The first foot includes a lower tread portion, a first wall is coupled with the lower tread portion and positioned adjacent a first surface of the first rail. A first boss is positioned against a second surface of the first rail. A first fastener extends through the first wall, through the first surface and second surface of the rail, and into the first boss.

18 Claims, 9 Drawing Sheets

(56) References Cited

U.S. PATENT DOCUMENTS

| | | | | |
|---|---|---|---|---|
| 1,141,950 | A | 6/1915 | Dickinson | |
| 1,587,383 | A | 6/1926 | Edward | |
| 1,944,792 | A | 1/1934 | House | |
| 1,984,655 | A | 12/1934 | Martin | |
| 2,316,939 | A | 4/1943 | Luca | |
| 2,639,853 | A | 5/1953 | Pierce | |
| 2,899,008 | A | 8/1959 | Larson | |
| 2,982,373 | A | 5/1961 | Henry | |
| 3,987,993 | A * | 10/1976 | Hopkins | E06C 7/14 248/210 |
| 4,155,422 | A | 5/1979 | Larson et al. | |
| 4,182,431 | A | 1/1980 | Wing et al. | |
| 4,210,224 | A | 7/1980 | Kummerlin et al. | |
| 4,236,603 | A * | 12/1980 | Talley | E06C 7/44 182/204 |
| 4,371,055 | A | 2/1983 | Ashton et al. | |
| 4,376,470 | A | 3/1983 | Ashton | |
| 4,407,045 | A | 10/1983 | Boothe | |
| 4,415,062 | A | 11/1983 | Shaw | |
| 4,566,150 | A | 1/1986 | Boothe | |
| 4,593,790 | A | 6/1986 | Brewer et al. | |
| 4,666,327 | A | 5/1987 | Su | |
| 4,666,328 | A | 5/1987 | Ryu | |
| 4,697,305 | A | 10/1987 | Boothe | |
| 5,062,179 | A | 11/1991 | Huang | |
| 5,228,511 | A | 7/1993 | Boquel et al. | |
| 5,279,387 | A | 1/1994 | Swiderski et al. | |
| 5,511,285 | A | 4/1996 | Bush et al. | |
| 5,573,081 | A | 11/1996 | Bartnicki et al. | |
| D388,883 | S | 1/1998 | Thivierge et al. | |
| 5,785,447 | A * | 7/1998 | Fonti | E04H 17/1413 403/396 |
| 5,850,894 | A | 12/1998 | Busenhart | |
| 5,937,968 | A | 8/1999 | Gibson et al. | |
| 6,095,466 | A * | 8/2000 | Sener | A47B 96/027 248/219.4 |
| 6,220,389 | B1 | 4/2001 | Krause | |
| 6,343,406 | B1 | 2/2002 | Yeh | |
| 6,443,260 | B1 | 9/2002 | Katz et al. | |
| 6,575,652 | B2 * | 6/2003 | Krauss | F16D 1/087 403/396 |
| 6,711,780 | B2 | 3/2004 | Lee | |
| 6,866,117 | B2 | 3/2005 | Moss | |
| 7,032,711 | B1 | 4/2006 | Katz et al. | |
| D597,685 | S | 8/2009 | Gibson et al. | |
| 7,575,097 | B2 | 8/2009 | Sheridan et al. | |
| 7,753,170 | B1 | 7/2010 | Gibson | |
| 8,186,481 | B2 | 5/2012 | Moss et al. | |
| 8,210,313 | B2 | 7/2012 | Astor | |
| 8,251,180 | B1 | 8/2012 | Paige | |
| 8,807,277 | B1 * | 8/2014 | Reyna Lerma | E06C 7/42 182/108 |
| 9,016,434 | B2 | 4/2015 | Moss et al. | |
| 9,194,407 | B1 * | 11/2015 | Straney | F16B 2/06 |
| D764,073 | S | 8/2016 | Wang | |
| 9,840,848 | B2 * | 12/2017 | Cleavenger, II | E04F 11/1808 |
| D819,834 | S | 6/2018 | Fiedeler | |
| 10,030,448 | B2 | 7/2018 | Miller | |
| 10,087,682 | B2 | 10/2018 | Pfeifer | |
| 10,138,680 | B2 | 11/2018 | Williams et al. | |
| 10,590,703 | B2 | 3/2020 | Parker et al. | |
| 10,612,305 | B2 | 4/2020 | Mora et al. | |
| 10,718,160 | B2 | 7/2020 | Leng | |
| 10,801,261 | B2 | 10/2020 | Peterson et al. | |
| 10,871,031 | B1 | 12/2020 | Moss et al. | |
| D944,417 | S | 2/2022 | B. et al. | |
| 11,274,494 | B2 | 3/2022 | Leng | |
| 2003/0188923 | A1 | 10/2003 | Moss | |
| 2005/0173194 | A1 | 8/2005 | Pate et al. | |
| 2005/0274571 | A1 | 12/2005 | Simpson et al. | |
| 2006/0060423 | A1 | 3/2006 | Astor | |
| 2008/0107529 | A1 | 5/2008 | Friedman | |
| 2010/0200331 | A1 | 8/2010 | Hager | |
| 2011/0024232 | A1 | 2/2011 | Leng | |
| 2012/0097481 | A1 | 4/2012 | Schienke et al. | |
| 2012/0211305 | A1 | 8/2012 | Moss et al. | |
| 2016/0076304 | A1 | 3/2016 | Smith et al. | |
| 2016/0348434 | A1 | 12/2016 | Williams et al. | |
| 2017/0130530 | A1 | 5/2017 | Lawler et al. | |
| 2017/0152710 | A1 | 6/2017 | Miller | |
| 2017/0356244 | A1 | 12/2017 | Peterson et al. | |
| 2018/0002982 | A1 | 1/2018 | Dressel | |
| 2018/0171714 | A1 | 6/2018 | Dings | |
| 2018/0187489 | A1 | 7/2018 | Parker et al. | |
| 2018/0230746 | A1 * | 8/2018 | Maxfield | E06C 7/423 |
| 2018/0258698 | A1 | 9/2018 | Minock | |
| 2018/0274296 | A1 | 9/2018 | Foley et al. | |
| 2018/0298691 | A1 | 10/2018 | Cook et al. | |
| 2018/0347278 | A1 | 12/2018 | Russell et al. | |
| 2019/0226279 | A1 * | 7/2019 | Beggs | E06C 1/18 |
| 2019/0376341 | A1 | 12/2019 | Maxfield et al. | |
| 2019/0376343 | A1 | 12/2019 | Maxfield et al. | |
| 2020/0048962 | A1 | 2/2020 | Moreno Moncada | |
| 2021/0246725 | A1 | 8/2021 | Wernberg et al. | |

FOREIGN PATENT DOCUMENTS

| | | | |
|---|---|---|---|
| GB | 189923045 | A | 12/1899 |
| GB | 191418109 | A | 12/1914 |
| JP | S5342040 | U | 4/1978 |
| JP | S62173500 | U | 11/1987 |
| KR | 200146389 | Y1 | 6/1999 |
| WO | 9429561 | A2 | 12/1994 |

OTHER PUBLICATIONS

International Search Report and Written Opinion dated Nov. 13, 2019 for International Application No. PCT/US2019/036172.
International Search Report and Written Opinion for International Application No. PCT/US2020/015074 dated Apr. 1, 2020.
U.S. Appl. No. 29/667,356, filed Oct. 19, 2018.
Design U.S. Appl. No. 29/667,352, filed Oct. 19, 2018.
Design U.S. Appl. No. 29/667,354, filed Oct. 19, 2018.
Design U.S. Appl. No. 29/667,357, filed Oct. 19, 2018.
Design U.S. Appl. No. 29/679,726, filed Feb. 8, 2019.
Design U.S. Appl. No. 29/679,733, filed Feb. 8, 2019.
U.S. Appl. No. 62/514,348, filed Jun. 2, 2017.
U.S. Appl. No. 62/732,997, filed Sep. 18, 2018.
Extended European Search Report for EP Application No. 23179459.5 dated Sep. 25, 2023.

* cited by examiner

FOOT FOR LADDERS, LADDERS INCORPORATING SAME AND RELATED METHODS

CROSS-REFERENCE TO RELATED APPLICATIONS

This application claims the benefit of U.S. Provisional Patent Application No. 62/797,046, entitled FOOT FOR LADDERS, LADDERS INCORPORATING SAME AND RELATED METHODS, filed on Jan. 25, 2019, the disclosure of which is incorporated by reference herein in its entirety.

BACKGROUND

The present invention relates generally to ladders, feet for ladders and related methods.

Ladders are conventionally utilized to provide a user thereof with improved access to elevated locations that might otherwise be inaccessible. Ladders come in many shapes and sizes, such as straight ladders, straight extension ladders, step ladders, and combination step and extension ladders. So-called combination ladders may incorporate, in a single ladder, many of the benefits of multiple ladder designs.

Ladders known as step ladders, sometimes referred to as A-frame ladders, are self-supporting ladders, meaning that they do not need to be leaned against a wall, pole or other structure for stability. Rather, step ladders may be positioned on a floor (or other similar surface) such that at least three, and conventionally four, feet of the ladder provide a stable support structure for a user to climb upon, even in an open space (e.g., outside or in the middle of a room) without a wall, roof, pole or other type of structure being necessary for the stability of the ladder.

Ladders such as combination ladders are highly utilized by various tradesman as well as homeowners. Such ladders are "self-supporting" in one configuration (e.g., in step ladder configuration) such that they do not need to have the upper end of the ladder to be positioned against a supporting structure (e.g., a wall or the edge of a roof). Rather, when in such a configuration, combination ladders conventionally utilize four feet, spaced from one another, to provide a stable structure and to support the ladder and a user when placed on, for example, a floor or the ground. This enables a user of the ladder to gain access to elevated areas even though the accessed area may be, for example, in the middle of a room, away from walls or other potential supporting structures that are conventionally required when using a straight ladder or an extension ladder.

Combination ladders may be placed in other configurations, including one wherein the ladder substantially extends in a single plane, such as a straight ladder or an extension ladder, providing access to increased height (as compared to when it is in the step ladder configuration) but typically requiring some elevated structure to support the ladder (e.g., a wall or the edge of a roof).

Nearly all ladders include feet at the lower end of their rails for positioning on a supporting surface. The feet may include anti-slip features (traction pads, spikes, etc.) and may be specifically configured for use indoors or out. Feet are conventionally attached to ladder rails using fasteners that are generally not removable without destruction of the fastener (e.g., rivets). For that reason, many users do not replace the feet although they may desire to (e.g., to replace and "outdoor" specific foot with an "indoor" specific foot or to replace a foot due to wear).

There is a continued desire to improve the functionality and flexibility of ladders and ladder accessories including providing various offerings and options such as replaceable or interchangeable feet that may be changed or replaced by a user of the ladder.

SUMMARY

Embodiments of ladders, feet for ladders and related methods are described herein. In one embodiment, a ladder is provided that includes, a first rail and a second rail, a plurality of rungs extending between and coupled to the first rail and the second rail, a first foot coupled with the first rail. The first foot includes a lower tread portion, a first wall coupled with the lower tread portion and positioned adjacent a first surface of the first rail, and a first boss positioned against a second surface of the first rail. A first fastener extends through the first wall, through the first surface and second surface of the rail, and into the first boss.

In one embodiment, the rail exhibits a C-shaped cross-sectional profile.

In one embodiment, the rail exhibits a closed polygonal cross-sectional profile.

In one embodiment, the first surface is located on a first side of a web of the first rail and wherein the second surface is located on a second, opposing side of the web of the first rail.

In one embodiment, the first surface is located on a first web of the first rail and wherein the second surface is located on a second web of the first rail.

In one embodiment, the boss is located within a hollow defined by the first rail.

In one embodiment, the foot includes a second boss, wherein a second fastener extends through the first rail and into the second boss.

In one embodiment the lower tread portion is pivotally coupled with the first wall.

In one embodiment, the first wall circumscribes a portion of the rail.

In one embodiment, the first boss is associated with an insert member.

In one embodiment, the first wall and the first boss are a unitary member.

In one embodiment, the first foot further comprises a second wall, the first boss being formed in the second wall.

In one embodiment, the fastener includes a screw. In one embodiment, the screw is self-tapping or self-drilling.

In one embodiment, the fastener extends into a blind hole within the first boss.

In another embodiment, a method of manufacturing a ladder is provided. The method comprises: providing a first rail and a second rail; coupling a first end of a rung to the first rail and a second end of the rung to the second rail; coupling a first foot to an end of the first rail. The act of coupling the first foot to and end of the first rail includes: positioning a first wall of the first foot adjacent a first surface of the first rail; positioning a first boss of the first foot adjacent a second surface of the first rail; passing a first fastener through the first wall, the first surface, the second surface and into the first boss.

In one embodiment, coupling a first foot to an end of the first rail further includes positioning a second boss of the first foot adjacent a portion of the first rail and passing a second fastener through the first wall, through the rail, and into the second boss.

In one embodiment, passing the first fastener into the first boss includes driving a screw into a smooth-walled hole formed in the first boss.

In one embodiment, passing the first fastener into the first boss includes driving a machine screw into a pre-tapped hole formed in the first boss.

In one embodiment, passing the first fastener into the first boss includes driving a screw directly into a solid boss.

It is noted that features, aspects or components of one embodiment may be combined with features, aspects or components or other embodiments without limitation.

BRIEF DESCRIPTION OF THE DRAWINGS

The foregoing and other advantages of the invention will become apparent upon reading the following detailed description and upon reference to the drawings in which.

DETAILED DESCRIPTION

Various embodiments of ladders and ladder components are described herein. The described embodiments are not mutually exclusive of each other. Rather, various features of one described embodiment may be used in conjunction with features of other described embodiments.

Embodiments described herein are applicable to, and may be used in conjunction with, various types of ladders (beyond the specific description of certain ladders set forth herein), and may include additional features and components including, without limitation, those described in U.S. Patent Publication No. 20190376341, entitled COMBINATION LADDERS, LADDER COMPONENTS AND RELATED METHODS published Dec. 12, 2019, and U.S. Patent Publication No. 20180230746 entitled LADDERS, FOOT MECHANISMS FOR LADDERS, AND RELATED METHODS published Aug. 16, 2018, the disclosures of each of which are incorporated by reference herein in their entireties.

Figure 1:
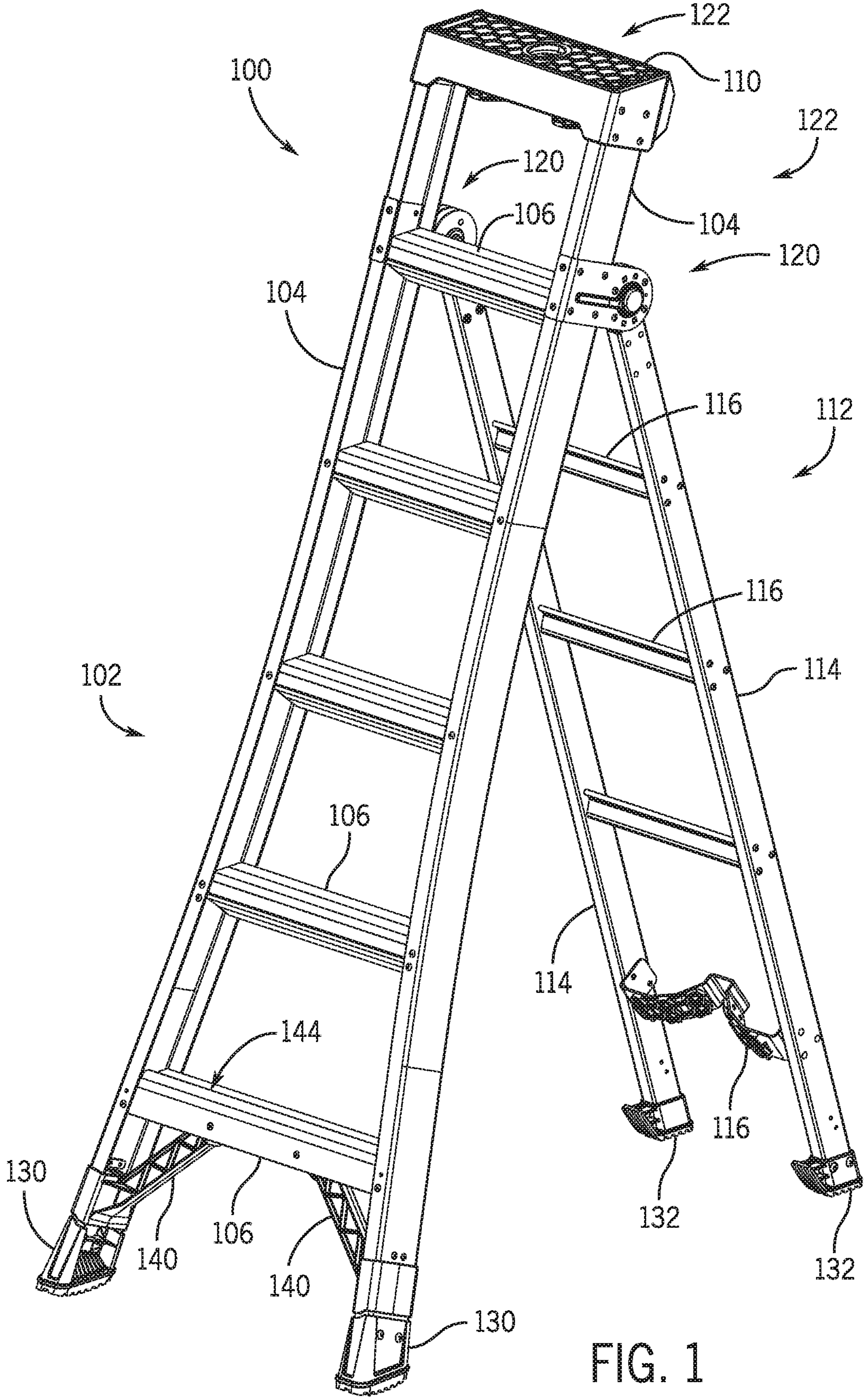
FIG. 1 is a front perspective view of a ladder in a first state according to an embodiment of the present disclosure.

Referring to FIG. 1, a ladder 100 is shown in accordance with an embodiment of the present disclosure. The ladder 100 includes a first assembly 102 having a pair of spaced apart rails 104 and a plurality of rungs 106 extending between and coupled to the rails 104. For purposes of convenience, the rungs 106 and rails 104 of the first assembly 102 may be referred to herein as "front rungs 106" or "front rails 104" respectively.

The front rungs 106 are spaced apart, substantially parallel to one another, and are configured to be substantially level when the ladder 100 is in an orientation of intended use so that the rungs 106 may be used as "steps" for a user to ascend the ladder 100 as will be appreciated by those of ordinary skill in the art. In various embodiments, the upper surface of the rungs 106 may include traction features (e.g., grooves and ridges, grip tape or other anti-slip features) to provide traction to a user while standing on the rungs 106. A top cap 110 may be coupled with the upper portions of the rails 104 and can be configured to support the weight of a user in the event that a user stands on the top cap 110. The upper surface of the top cap 110 may also include traction or anti-slip features to provide traction to a user while standing thereon.

The ladder 100 also includes a second assembly 112 having a pair of spaced apart rails 114. A plurality of rungs 116 extend between and are coupled to the spaced apart rails 110. For purposes of convenience, the rungs 116 and rails 114 of the second assembly may be referred to herein as "rear rungs 116" and "rear rails 114" respectively. It is noted that the use of the terms "front" and "rear" herein is not to be considered limiting, but is used for purposes of convenience and clarity in describing various components or assemblies of the embodiments of the present disclosure.

The rear rungs 116 are spaced apart, substantially parallel to one another, and are configured to be substantially level when the ladder 100 is in an orientation for intended use so that the rear rungs 116 may be used as "steps" for a user to ascend the ladder 100. In various embodiments, the upper surface (considering the orientation of the ladder as viewed in FIG. 1) of the rear rungs 116 may include traction features (e.g., grooves and ridges, grip tape or other anti-slip features) to provide traction to a user while standing on the rear rungs 116. Additionally, or alternatively, in some embodiments, the rear rungs 116 may include traction features or anti-slip features formed the lower surface thereof (again, as viewed in FIG. 1).

The second assembly 112 is pivotally coupled with the first assembly 102 via a pair of hinge assemblies 120 (sometimes referred to as "hinges" herein for purposes of brevity). In the embodiment shown, the hinges 120 are spaced away from the top cap 110 along the length of the rails 104 of the first assembly 102. For example, the hinges 120 may be positioned adjacent the rung 106 that is closest to the top cap 110. In one embodiment, this may be approximately 12 inches from the top of the first assembly 102. The hinges 120 are configured to lock the first assembly 102 and the second assembly 112 in one or more desired positions relative to each other. Thus, for example, in FIG. 1, the first and second assemblies 102 and 112 are locked such that the rear rails 114 extend at an acute angle relative to the front rails 104, placing the ladder in a step ladder configuration.

It is noted that, in some embodiments, the ladder 100 does not include any spreader mechanisms (i.e., hinged, folding braces that extend between the first and second assemblies) that are conventionally used to accommodate the folding of the ladder as well as the "locking" of the first and second assemblies 102 and 112 relative to each other in a step ladder configuration. Instead, in various embodiments of the present disclosure, the locking of the hinges 120 maintains the desired positioning of the first and second assemblies in a deployed, step ladder configuration as shown in FIG. 1.

As described in previously incorporated U.S. Patent Publication No. 20190376341, the hinges 120 also enable the second assembly 112 to selectively rotate relative to the first assembly 102 such that the rear rails 114 may be positioned to extend at an angle of substantially 180 degrees from the front rails 104. Stated another way, the front rails 104 and rear rails 114 extend from each other in a generally parallel manner with a significant portion of the second assembly 112 extending upwards and beyond the top cap 110. The hinges 120 may also be configured to lock the first and second assemblies 102 and 112 in this relative position, which may be considered a straight ladder configuration, providing a user with the ability to reach extended heights (beyond that of the step ladder configuration) when the ladder is leaned against an appropriate support surface (e.g., a wall or the edge of a roof).

Additionally, the second assembly 112 may be selectively positioned, relative to the first assembly, in a storage or leaning configuration, wherein the rear rails 114 are placed adjacent to, and extend substantially parallel to, the front rails 104. In this configuration, no portion of the second assembly extends upwards beyond the top cap 110 as occurs in the straight ladder configuration. In this configuration, the ladder 100 may be stored in relatively compact space, or it may be used to lean up against a supporting surface or an object (e.g., a wall or a pole), placing the user closer to the supporting surface.

The first assembly 102 and the second assembly 112 may additionally include feet 130 and 132 formed at, or coupled to, the end of the front and rear rails 104 and 114, respectively. The feet 130 and 132 may be configured to engage a supporting surface such as the ground. The feet 130 and 132 may exhibit any of a variety of configurations depending on, for example, the type of environment in which the ladder is anticipated to be used. For example, the feet 130 and 132 may be formed of a plastic or a polymer material and be configured with a plurality of ridges, knobs or other engagement features configured to provide increased friction between the ladder and a relatively rigid supporting surface (e.g., concrete, tile or wood). In one embodiment, the feet 130 and 132 may include a body portion formed of a first material (e.g., plastic or metal) that is overmolded with a rubber or a polymer material to provide a desired surface (both in geometry and frictional performance). Additionally, or alternatively, the feet 130 and 132 may include features such as barbs or other sharp protrusions configured to dig into a relatively softer supporting surface (e.g., dirt or grass).

In some embodiments, the ladder 100 may include other components including, for example, various bracing members. For example, one or more brace members may be used to provide increased strength, rigidity, and/or durability to the ladder. In one example, with reference to FIGS. 1-6, brace members 140 may be coupled between the rails (e.g., the front rails 104) and their associated rungs (e.g., the front rungs 106). Such a brace 140 may be coupled to the various members by mechanical fastening, material joining, use of adhesives, or other techniques. In one particular example, the brace may be fastened to one component (e.g., to a rung 106) by way of a mechanical fastener, while being coupled with another component (e.g., to a rail 104) by encircling the component. Examples of some potential braces, along with techniques of coupling braces with associated components, are described in U.S. Patent Publication No. 20180298691, entitled BRACES FOR LADDERS, LADDERS INCORPORATING SAME AND RELATED METHODS published on Oct. 18, 2018, the disclosure of which is incorporated by reference herein in its entirety.

In some embodiments, a mechanism or assembly 144, configured as a last-step indicator, may be incorporated into or otherwise associated with a lowermost rung or the ladder (e.g., the lowermost rung 104 of the first assembly 102). The assembly 144 may be configured such that, when a user is descending the ladder 100 and places their weight on the lowermost rung, an alert (e.g., a sound, light, or vibrational signal) is provided to the user, indicating that this is the last rung in their descent, and that their next "step down" will be to the supporting surface (e.g., the floor or ground). Some examples of mechanisms or assemblies used as last-step indicators are described in U.S. Patent Publication No. 20160076304, published on Mar. 17, 2016, the disclosure of which is incorporated by reference herein in its entirety.

The first and second assemblies 102 and 112 may be formed of a variety of materials and using a variety of manufacturing techniques. For example, in one embodiment, the rails 104 and 114 may be formed of a composite material, such as fiberglass, while the rungs 106 and 116 and other structural components may be formed of aluminum or an aluminum alloy. In some embodiments, the top cap 110 may be formed of a plastic material and may be molded. In other embodiments, the assemblies 102 and 112 (and their various components) may be formed of a variety of other materials including, for example, other composites, plastics, polymers, metals and metal alloys.

Figure 2:
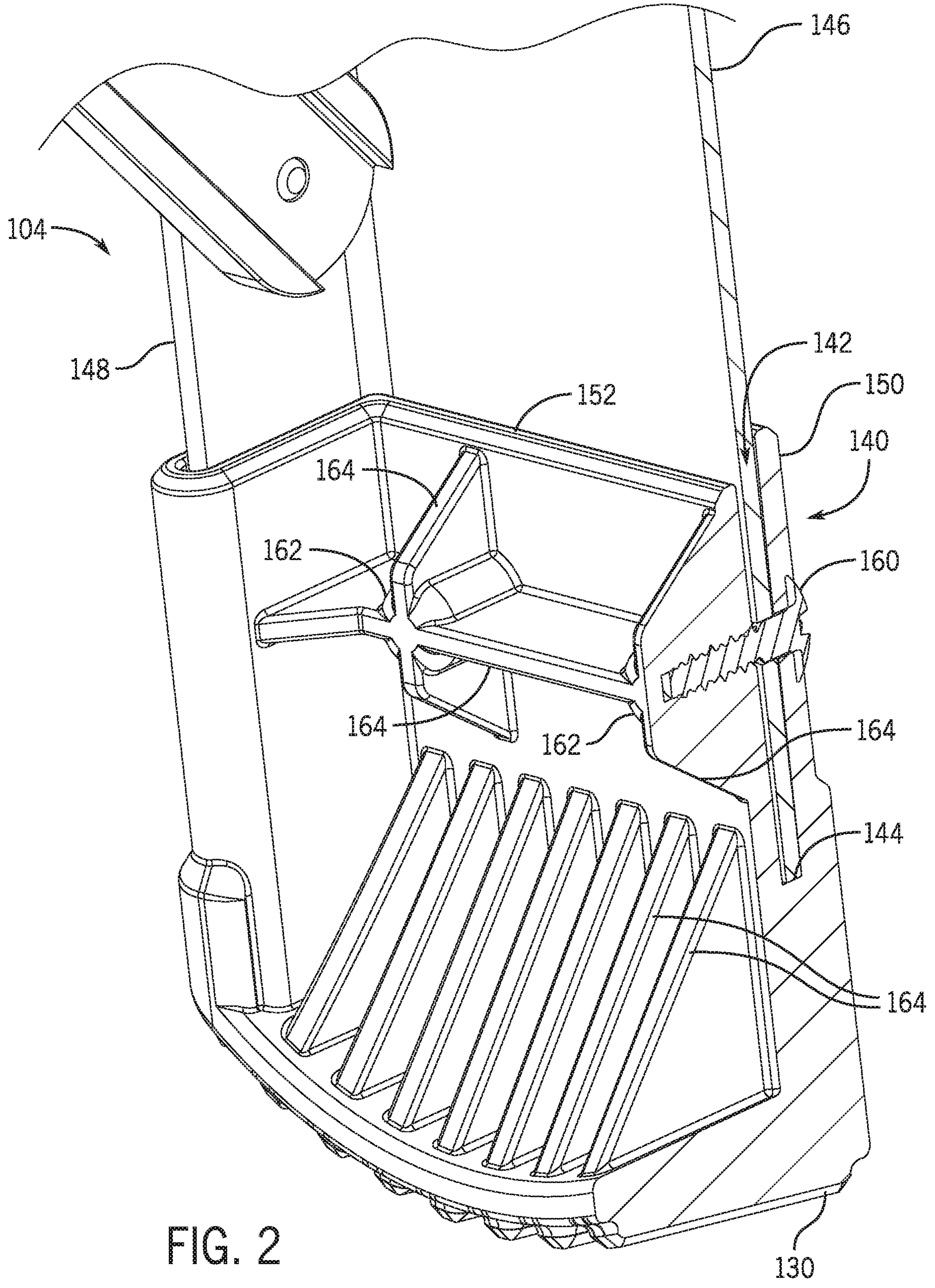
FIG. 2 is a partial cross-sectional view of a foot and a rail of a ladder according to an embodiment of the present disclosure.

Referring now to FIG. 2, a foot 130 is described in further detail in accordance with an embodiment of the present disclosure. FIG. 2 depicts a partial cross-sectional view of a front rail 104 and associated foot 130. The foot 130 includes a body portion 140 defining a channel 142 for receipt of the rail member 104. The channel 142 may be configured as a blind channel, meaning that it has a floor 144 or other abutment surface configured to abut the bottom edge of the rail as shown in FIG. 2.

The channel may be configured to exhibit a geometry that is complementary to the cross-sectional profile of the rail 104. For example, if the rail 104 is configured to generally exhibit a C-shaped cross-sectional profile, the channel 142 may be configured to exhibit a corresponding C-shaped geometry for complementarily receiving the rail 104. While the illustration shown in FIG. 2 only shows a portion of a rail 104 and foot 130, including a web portion 146 of the rail 104 and a flange portion 148 of the rail 104, it is noted that the rail 104 may include a second flange portion spaced apart from the first flange portion 148 and coupled with the web portion 146 to form such a C-shaped profile.

The channel 142 may define a pair of opposing walls including what may be termed an outer wall 150 and inner wall 152. The two walls 150 and 152 are positioned on opposing sides of the rail 104 (e.g., on opposing sides of the web portion 146 of the rail 104). The channel 142 may define additional walls (e.g., inner and outer) associated with the flange portions 148. As shown in FIG. 2, the walls associated with the web portion 146 and the walls associated with the flange portions 148 may be connected with each other to form a continuous wall having corners, curves or other transitions therein.

A pair of fasteners 160 (only one shown in FIG. 2) may be used to help fasten the foot 130 to the rail 104. Each fastener extends through an opening in the outer wall 150, through the rail 104, and into the inner wall 152 to fasten or couple the foot 130 to the ladder rail 104. A pair of bosses 162 may be formed in the inner wall 152 such that each fastener 160 extends into an associated boss 162. In one embodiment, the fasteners 160 may include screws having the threads engaging an interior portion of the bosses 162. In some embodiments, in addition to providing an interfering structure that keeps the foot 130 from sliding off of the rail 104, the fasteners 160 may be tightened to clamp or squeeze the portion of the rail 104 that is positioned between the outer wall 150 and the associated boss 162.

In some embodiments, holes may be pre-formed in the outer wall 150, the rail 104 (such as in the web portion 146) and the inner wall 152 into the bosses 162. The holes that extend into the bosses 162 may be blind holes. In one embodiment, the holes—including the holes in the bosses 162—may be smooth-walled (e.g., not tapped or threaded) such that the threads of a screw cut into and engage the walls of at least the hole within the boss 162. In some embodiments, the fastener may include a self-tapping screw.

In another embodiment, the fasteners 160 may include a self-drilling screws and the holes need not be pre-formed in the foot 130 (including in the bosses 162) or the rail 104 prior to installing the fastener 160. In yet another embodiment, one or more of the holes (e.g., the holes extending into the bosses 162) may be pre-formed and pre-tapped and the fastener 160 may include a machine screw or other similar fastener.

As seen in FIG. 2, the foot 130 may include a plurality of ribs 164, gussets or other reinforcing members positioned between adjacent components (e.g., between the inner wall 152 and the bosses 162, between the lowermost portion or floor of the foot and the inner wall 152, etc.). As previously discussed the foot may include various traction features such as alternating ribs and grooves, other textured geometries and the like. In one embodiment, the foot 130 may be formed as a unitary member such as by molding. The foot 130 may be formed from a variety of different materials including plastic materials, polymer materials, metals and metal alloys or composite materials. In some embodiments, the foot 130 may be formed having a unitary body member (e.g., including the outer wall and inner wall) while having a rubberized or polymer tread portion overmolded thereto (or otherwise joined with or adhered thereto). In other embodiments, the foot 130 may be formed of multiple components joined together using appropriate manufacturing techniques (e.g., welding, joining, co-molding, fusion bonding, adhering, etc.).

Use of a foot having a configuration such as shown in FIG. 2 (and in accordance with other embodiments described herein) provides various advantages. For example, use of a screw for a fastener 160 enables a typical owner of a ladder (whether a professional tradesman or a homeowner) to easily remove the foot without needing special tools or skills, and without the risk of damaging the rails of the ladder (such as by drilling out a rivet). Additionally, by having the threads of the screw fasten into a portion of the body of the foot rather that into the rail itself, if the screw strips the hole into which it is inserted (e.g., the hole within the boss), the foot may easily and inexpensively be replaced instead of having to replace or repair the rail of the ladder (e.g., such as in the case that a screw stripped a hole in the rail).

Figure 3:
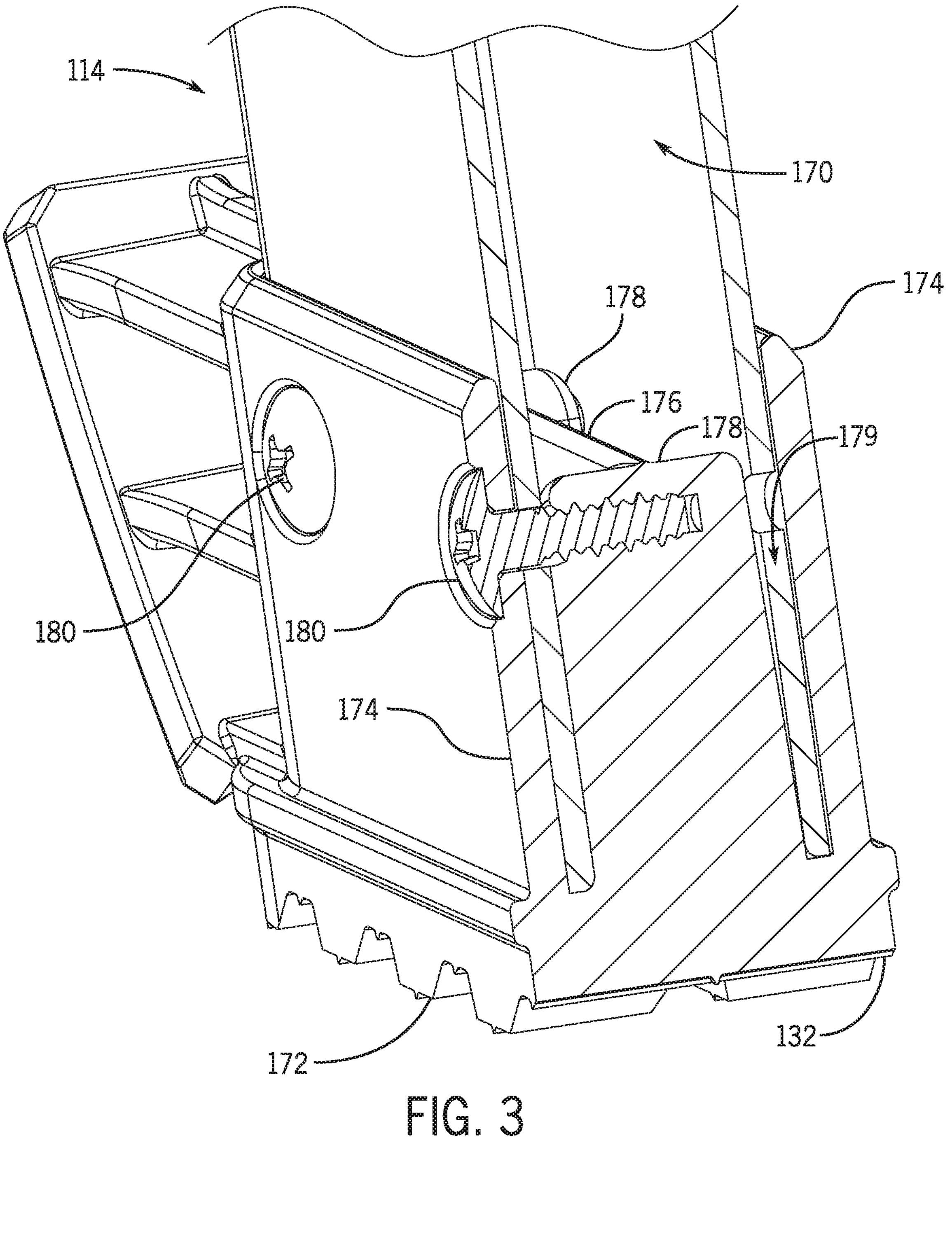
FIG. 3 is a partial cross-sectional view of a foot and a rail of a ladder according to another embodiment of the present disclosure.

Referring to FIG. 3, another foot 132 is described with respect to an embodiment of the present disclosure. The foot 132 is coupled with a rear rail 114 of the ladder 100 shown in FIG. 1. The rail 114 may be configured to exhibit a closed cross-sectional profile such as a generally rectangular shape having a hollow interior portion 170. The foot 132 may include a lower tread portion 172 configured to engage the ground or other supporting surface. The tread portion 172 may be coupled with an outer peripheral wall 174 and an upwardly extending projection 176 or appendage that fits within the hollow interior portion 170 of the rail 114. The projection 176 may include one or more bosses 178 configured for receipt of one or more fasteners 180. A channel or groove 179 is defined between the outer wall 174 and the projection 176 (and its associated bosses 178) which receives the end of the rail 114. The fasteners 180 extend through holes formed in the outer peripheral wall 174, the rail 114 and the associated boss 178 (or other portion of the projection 176). In the embodiment shown, the fasteners 180 do not extend beyond the bosses 178 or into or through the opposing wall of the rail 114. However, in other embodiments, the fasteners could extend through the opposing wall of the rail 114, and even into additional bosses formed in the opposing portion of the outer wall such as described below in accordance with a further embodiment.

The fasteners and holes may be configured such as described above with respect to the embodiment illustrated in FIG. 2. As described above, in addition to providing an interfering structure that keeps the foot 132 from sliding off of the rail 114, the fasteners 180 may be tightened to clamp or squeeze the portion of the rail 114 that is positioned between the outer peripheral wall 174 and the associated boss 176. The foot 132 may be formed of a variety of materials using a variety of manufacturing techniques such as discussed above with respect to the embodiment illustrated in FIG. 2. In one embodiment, the foot 132 may be formed as a unitary member. In some embodiments, the foot 132 may be formed having a unitary body member (e.g., including the outer peripheral wall and the projection) while having a rubberized or polymer tread portion overmolded thereto (or otherwise joined with or adhered thereto). In other embodiments, the foot 132 may be formed of multiple components joined together using appropriate manufacturing techniques (e.g., welding, joining, co-molding, fusion bonding, adhering, etc.).

Figure 4:
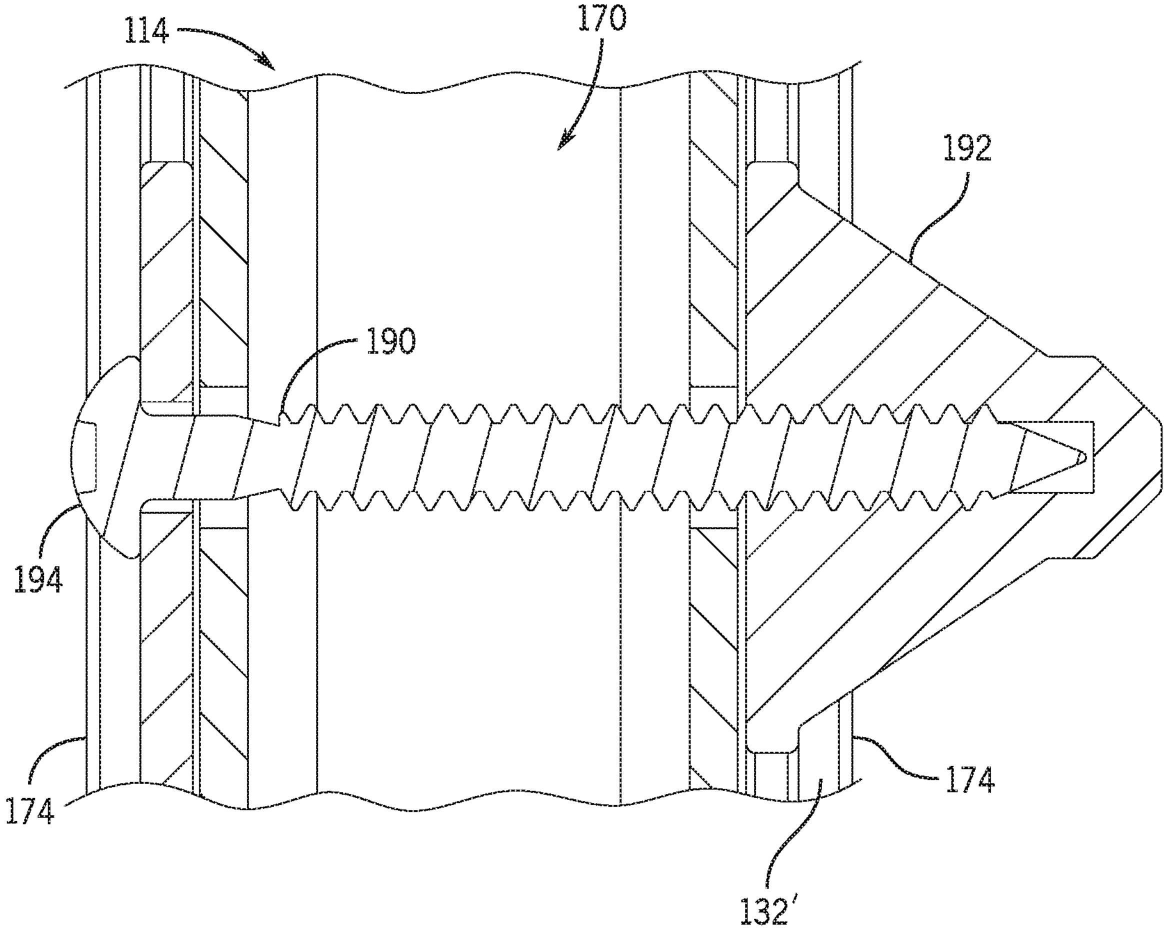
FIG. 4 is a partial cross-sectional view of a foot and a rail of a ladder according to another embodiment of the present disclosure.
Figure 5:
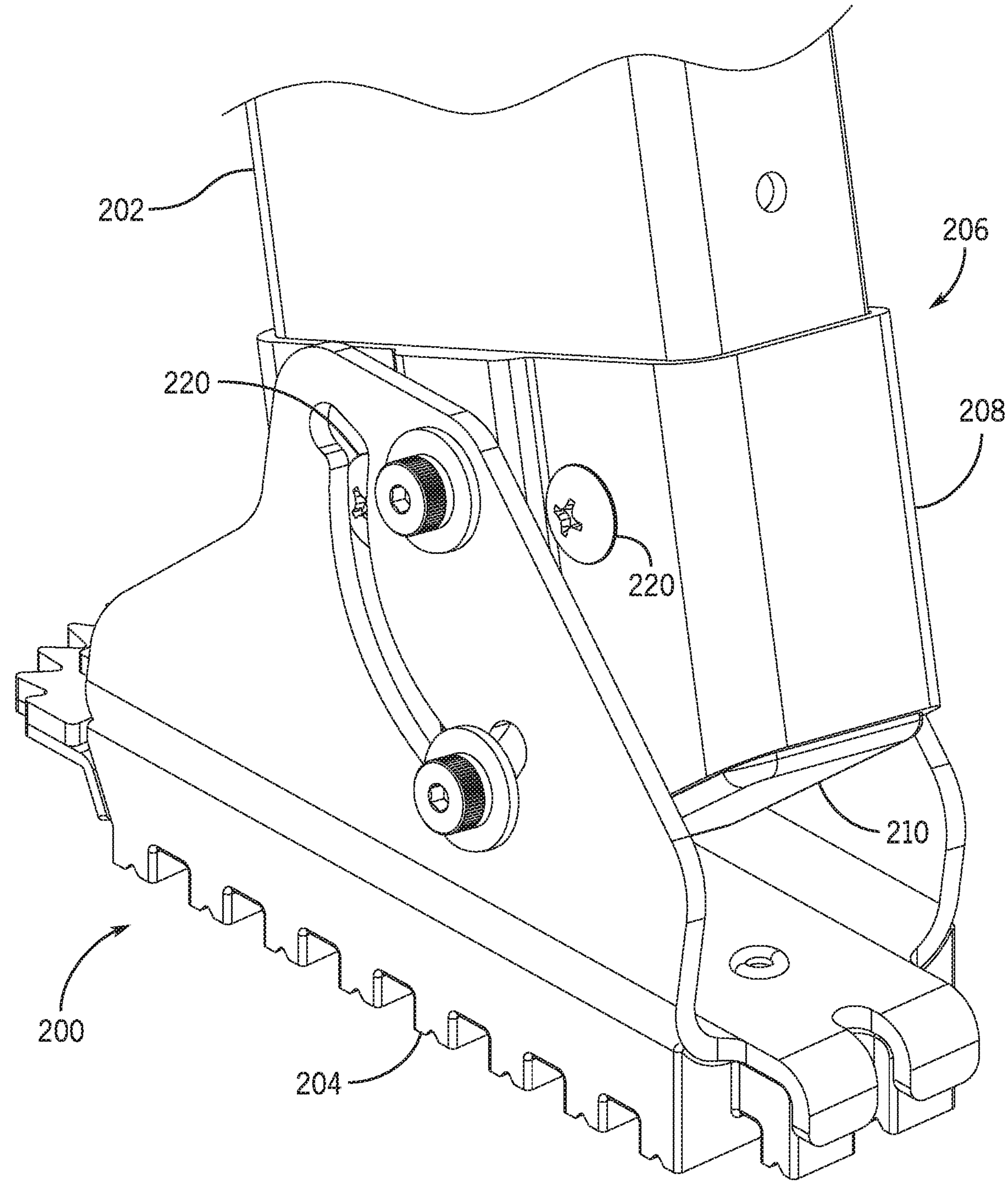
FIG. 5 is a perspective view of a foot and a rail of a ladder according to an embodiment of the present disclosure.
Figure 6:
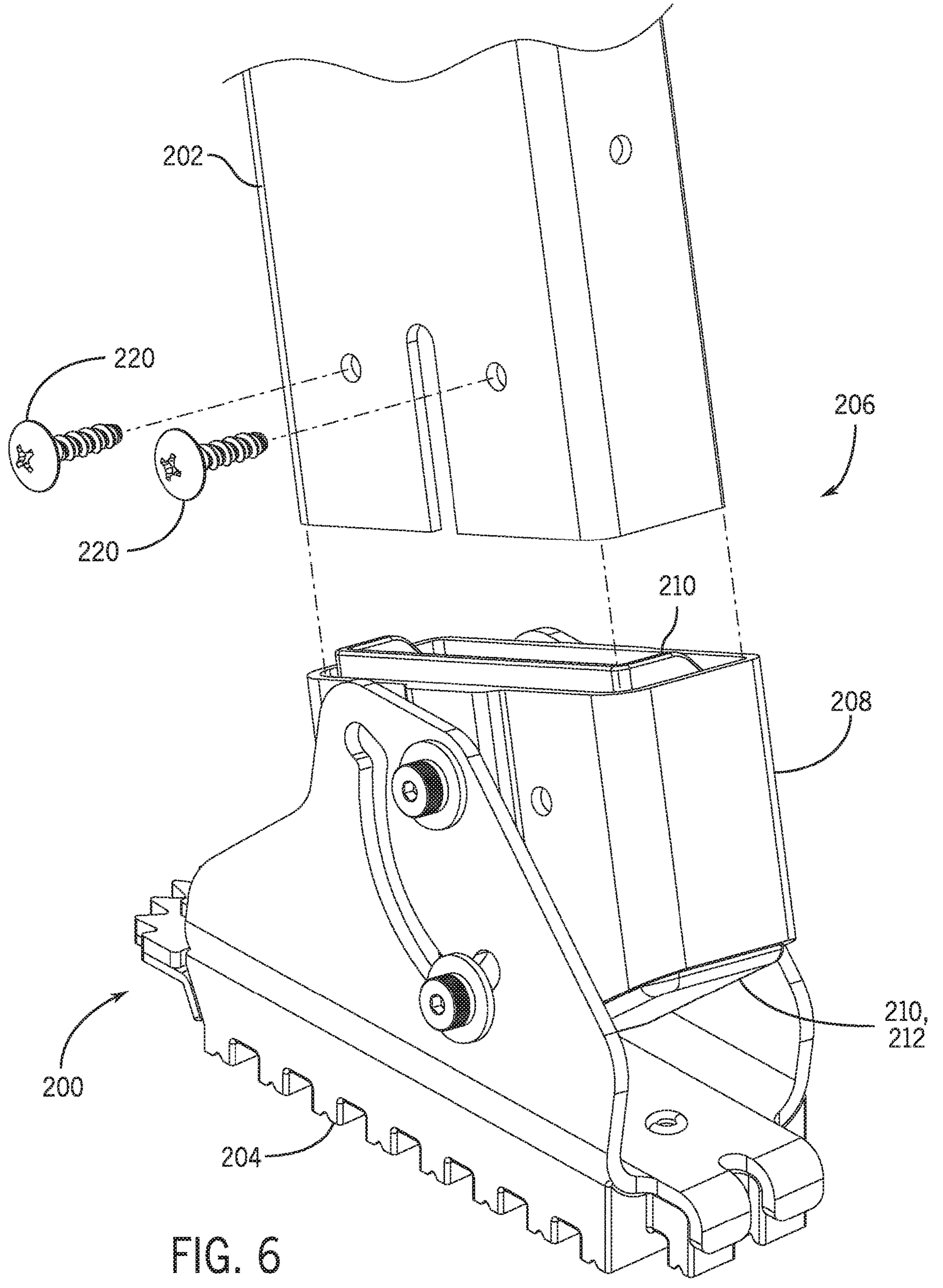
FIG. 6 is a partially exploded view of the foot and rail shown in FIG. 5.

Referring to FIG. 4, another foot 132' is shown in accordance with an embodiment of the present disclosure. The foot 132' is coupled with a rear rail 114 of the ladder 100 shown in FIG. 1. The rail 114 may be configured to exhibit a closed cross-sectional profile such as a generally rectangular shape and may have a hollow interior portion 170. The foot 132' may include a lower tread portion (not shown in FIG. 4) configured for engaging the ground or other supporting surface. The tread portion 172 may be coupled with an outer peripheral wall 174. The outer peripheral wall 174 may be configured to define a void or opening for receiving the end of the rail 114. The fasteners 190 extend through holes formed in a first portion of the outer peripheral wall 174, a first portion (e.g., a first web portion) of the rail 114, a second portion (e.g., a second web portion) of the rail 114, a second portion of the outer peripheral wall 174 into a boss 192 formed on the second portion of the outer peripheral wall 174. The fasteners and holes may be configured such as described above with respect to the embodiment illustrated in FIG. 2. As described above, in addition to providing an interfering structure that keeps the foot 132 from sliding off of the rail 114, the fasteners 180 may be tightened to clamp or squeeze the rail 114 at a location that is positioned between the outer peripheral wall 174 and the associated boss 176. In this case, rather than simply clamping a single portion of a web (or flange) of a rail with the fastener 190, two spaced apart web portions (or flange portions) may be squeezed towards each other with a clamping force applied by the fastener 190 which is coupled with the boss 192 (via threads) and abuts the outer peripheral wall 174 by way of the fastener head 194. Again, as noted above, such a configuration could be combined with the embodiment described with respect to FIG. 3, having a projection or other portion extending upward into the hollow interior portion 170 of the rail 114.

Referring now to FIGS. 5-9, foot 200 is described in accordance with another embodiment of the present disclosure. The foot 200 is attached to a rail 202 (which may include, for example, a rail similar to those shown and described with respect to FIGS. 1-4) and may be an adjustable foot and include features and components such as described in previously incorporated U.S. patent application Ser. No. 15/897,995.

Figure 7:
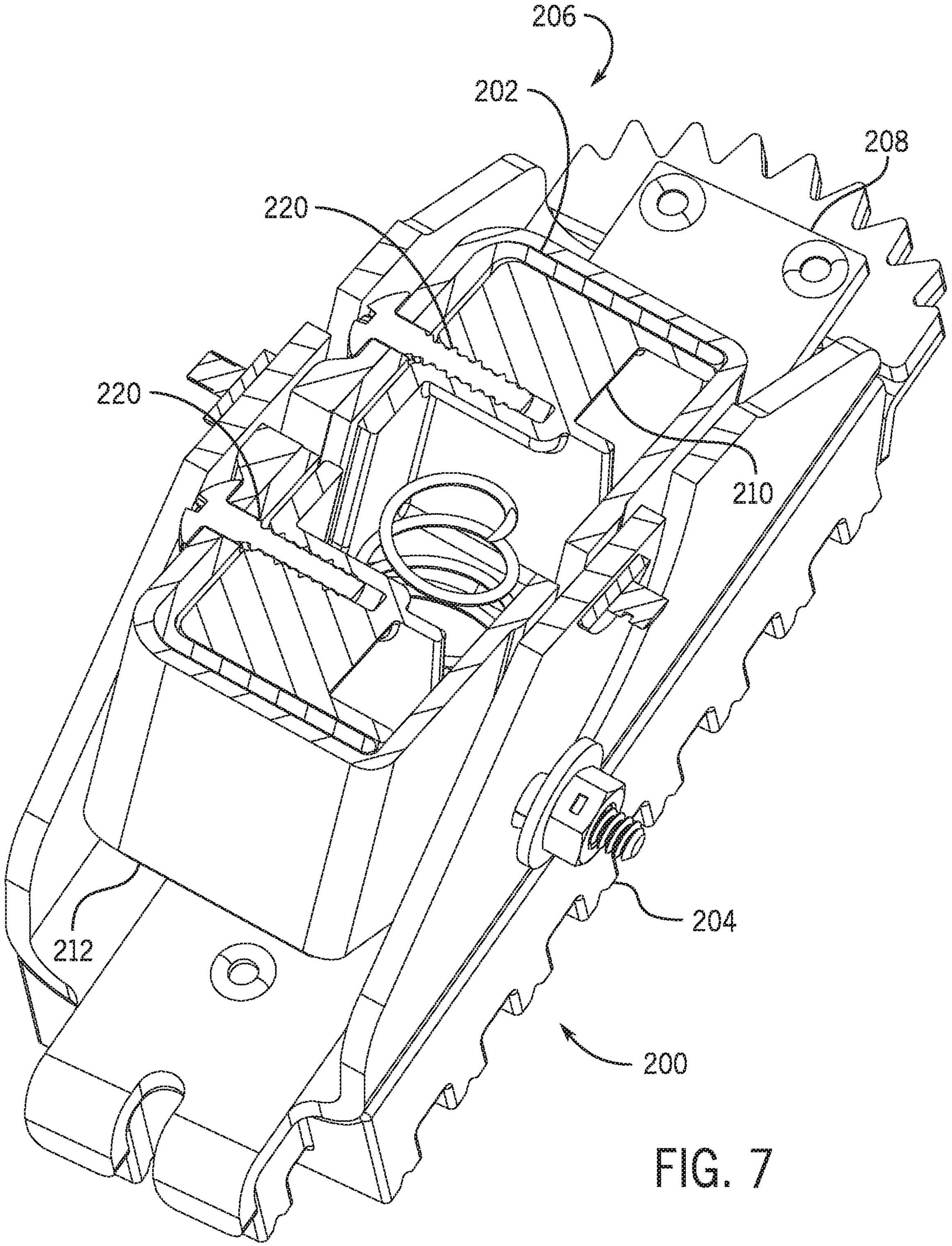
FIG. 7 is a partial cross-section of the foot and rail shown in FIG. 5.

Thus, the foot 200 may include a lower tread portion 204 that is pivotally coupled to a rail mount portion 206. The rail mount portion 206 may include a sleeve 208 and an insert member 210. The rail 202 may be disposed in a channel defined between the sleeve 208 and the insert portion 210. For example, as seen in FIG. 7, the rail 202 may exhibit a cross-sectional profile of a C-shape and have the lower end of its web portion and flange portions partially disposed within the sleeve 208. A portion of the insert member 210 may be disposed within the channel defined by the web and flange portions of the rail 202 such that the rail 202 (or at least a portion thereof) is positioned between the sleeve 208 and the insert member 210.

Figure 8:
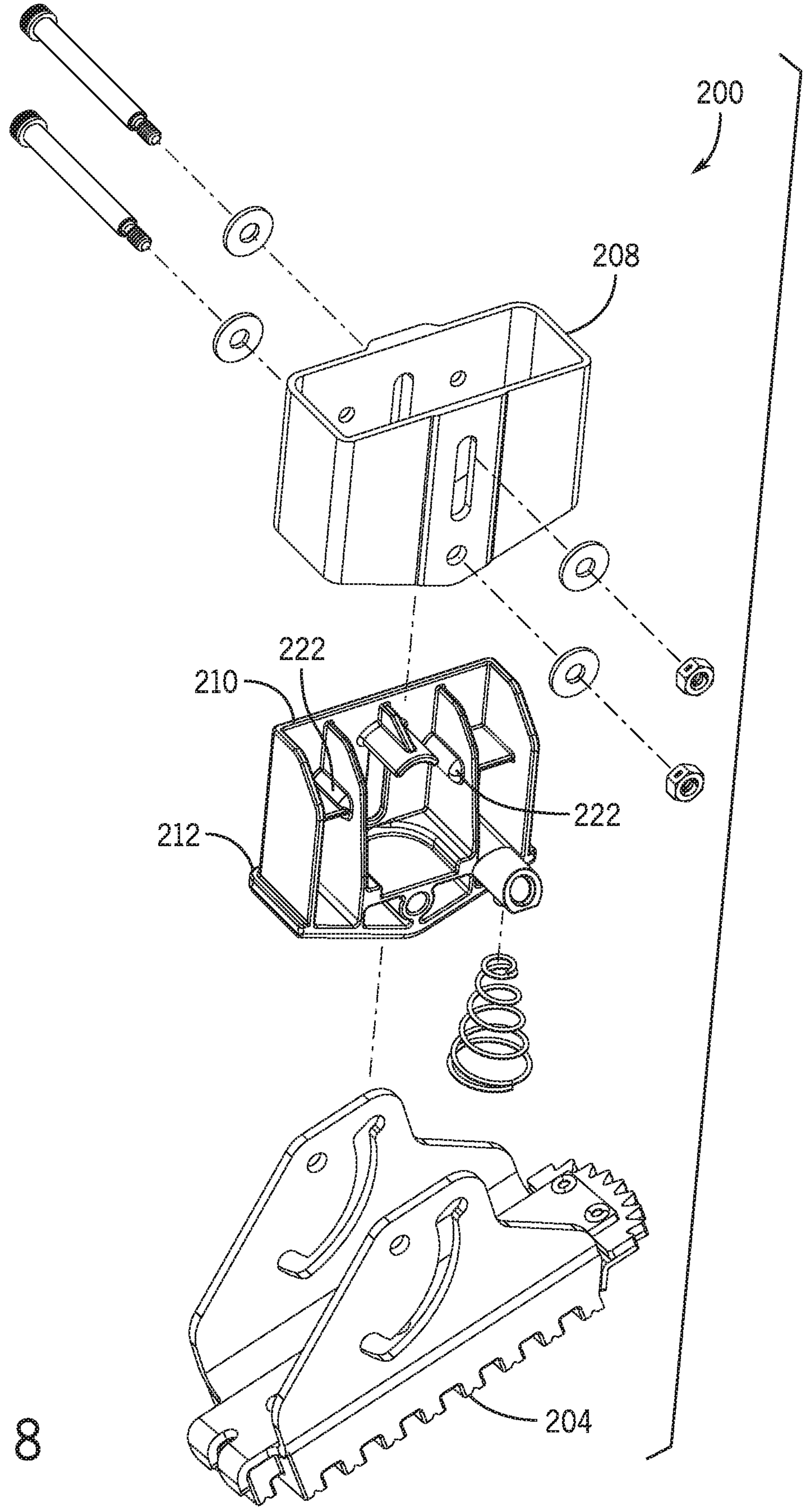
FIG. 8 is an exploded view of the foot and rail shown in FIG. 5.
Figure 9:
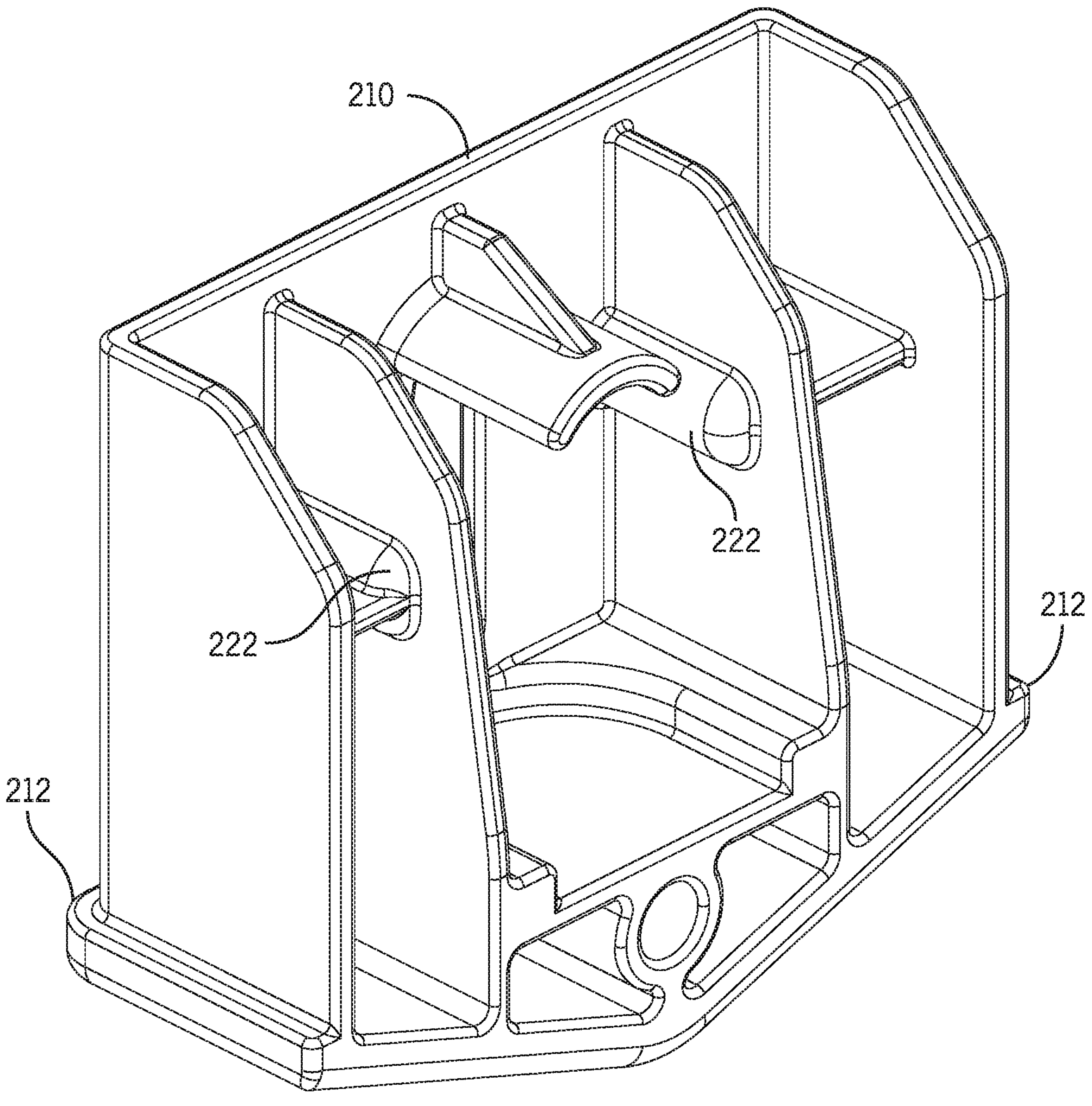
FIG. 9 is a perspective view of a portion of the foot shown in FIGS. 5-8.

As seen in FIG. 8, assembly of the various components may include the insert member 210 being disposed in the sleeve 208 from a bottom or lower side of the sleeve 208 such that a ridge or abutment shoulder 212 (see also FIG. 9) abuts against a lower edge of the sleeve 208. As best seen in FIG. 7, the foot 200 is attached to the rail 202 by way of fasteners 220 extending through a wall of the sleeve 208, through the rail 202 (e.g., through the web portion of the rail 202) and into bosses 222 (or other thickened portions) of the insert member 210. As with embodiments described above herein, the in addition to providing an interfering structure that keeps the foot 200 from sliding off of the rail 202, the fasteners 220 may be tightened to clamp or squeeze the portion of the rail 202 that is positioned between the sleeve 208 and the insert member 210.

As with other embodiments described herein, various materials and manufacturing techniques may be used to form the foot 200. For example, in one embodiment, the lower tread portion 204 may be formed of a rubber or polymer tread member coupled to (adhered, overmolded, or otherwise joined) with a bracket that is formed of a metal or metal alloy. Additionally, the sleeve 208 may be formed from a metal or metal alloy material. Further, the insert member 210 may be formed of a plastic or polymer material and may be formed by molding.

It is noted that the feet and foot rail assemblies described herein are not limited to a specific type of ladder. The present disclosure contemplates incorporation of the feet and foot and rail assemblies in various types of ladders including, but not limited to, step ladders, straight ladders, extension ladders, and combination ladders including articulating ladders.

While the embodiments of the disclosure may be susceptible to various modifications and alternative forms, specific embodiments have been shown by way of example in the drawings and have been described in detail herein. However, it should be understood that the embodiments are not intended to be limited to the particular forms disclosed. Additionally, features of one embodiment may be combined with features of other embodiments without limitation. All modifications, equivalents, and alternatives are considered to fall within the spirit and scope of the disclosure including those defined by the following appended claims.

What is claimed is:

1. A ladder comprising:

a first rail and a second rail, the first rail having a C-shaped cross-sectional profile including a first flange and a second flange, the second flange being spaced apart from and positioned opposite the first flange on the first rail;

a plurality of rungs extending between and coupled to the first rail and the second rail;

a first foot coupled with the first rail, the first foot including:

a lower tread portion, a first wall coupled with the lower tread portion and positioned adjacent a first surface of the first rail, a second wall coupled with the lower tread portion and positioned against a second surface of the first rail, a third wall associated with the first flange, a fourth wall associated with the second flange, a first boss positioned on and extending away from the second wall, a blind hole defined in the first boss, a first rib extending from the second wall of the foot to the first boss, and a second rib extending from the third wall to the first boss; and a first fastener extending through the first wall, through the first surface and second surface of the first rail, and into the blind hole defined in the first boss.

2. The ladder of claim 1, wherein the first surface is located on a first side of a web of the first rail and wherein the second surface is located on a second, opposing side of the web of the first rail.

3. The ladder of claim 1, wherein the first boss is located within a hollow defined by the first rail.

4. The ladder of claim 1, wherein the first foot includes a second boss, and wherein a second fastener extends through the first rail and into the second boss.

5. The ladder of claim 1, wherein the first wall circumscribes a portion of the first rail.

6. The ladder of claim 1, wherein the first wall and the first boss are a unitary member.

7. The ladder of claim 1, wherein the first fastener includes a screw.

8. The ladder of claim 7, wherein the screw is self-tapping or self-drilling.

9. A method of manufacturing a ladder, the method comprising:

providing a first rail and a second rail, at least the first rail having a closed polygonal cross-section defining a hollow interior portion;

coupling a first end of a rung to the first rail and a second end of the rung to the second rail; and coupling a first foot to an end of the first rail by:

positioning a first wall of the first foot adjacent a first surface of the first rail;

positioning a projection of the first foot into the hollow interior portion of the first rail;

positioning a first boss of the projection of the first foot adjacent a second surface of the first rail, the first boss being a solid boss; and driving a first fastener through the first wall, the first surface, and the second surface and directly into the first boss.

10. The method according to claim 9, wherein coupling the first foot to the end of the first rail further includes positioning a second boss of the first foot adjacent a portion of the first rail and passing a second fastener through the first wall, through the rail, and into the second boss.

11. The method according to claim 9, wherein the first fastener comprises a screw.

12. The method according to claim 9, wherein the first fastener clamps the first wall against the first boss at the projection.

13. The method according to claim 9, wherein the closed polygonal cross-section is rectangular.

14. A ladder comprising:

a first rail and a second rail;

a plurality of rungs extending between and coupled to the first rail and the second rail;

a first foot coupled with the first rail, the first foot including:

a rail mount portion;

a lower tread portion; and an insert member, the first rail being positioned in a channel between the rail mount portion and the insert member, the insert member including:

a first wall coupled with the lower tread portion, a first boss extending away from the first wall, a blind hole defined in the first boss; and a first fastener extending through the first wall, through a first surface of the first rail and a second surface of the first rail, and into the blind hole defined in the first boss.

15. The ladder of claim 14, wherein the rail mount portion defines a four-sided cavity surrounding the channel.

16. The ladder of claim 14, wherein the lower tread portion is pivotally coupled with the insert member.

17. The ladder of claim 14, wherein the insert member comprises a ridge abutting against a bottom side of the rail mount portion.

18. The ladder of claim 14, wherein the first fastener clamps the first rail between the rail mount portion and the insert member.

* * * * *